(12) United States Patent  (10) Patent No.: US 8,387,860 B2
Arakawa  (45) Date of Patent: Mar. 5, 2013

(54) IMAGE FALSIFICATION DETECTION DEVICE AND IMAGE FALSIFICATION DETECTION METHOD

(75) Inventor: Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 12/962,958

(22) Filed: Dec. 8, 2010

(65) Prior Publication Data

US 2011/0139866 A1 Jun. 16, 2011

(30) Foreign Application Priority Data

Dec. 10, 2009 (JP) ................................. 2009-280736

(51) Int. Cl.
 *G06F 17/00* (2006.01)
(52) U.S. Cl. ......................................... 235/375; 235/487
(58) Field of Classification Search .................. 235/375, 235/376, 382.5, 487; 705/76
See application file for complete search history.

(56) References Cited

U.S. PATENT DOCUMENTS

2005/0038756 A1\* 2/2005 Nagel .............................. 705/76
2009/0009782 A1   1/2009 Arakawa
2009/0297033 A1  12/2009 Ito et al.

FOREIGN PATENT DOCUMENTS

JP  2009-259436  11/2009

OTHER PUBLICATIONS

Catalog for "Guardian of Paper", security software for printed documents. Feb. 2009. Hitachi Government & Public Corporation System Engineering, Ltd.
Catalog for "Guardian of Paper", security software for printed documents, Hitachi Government & Public Corp. Systems Engineering Ltd., published Feb. 2009 (with partial English translation).

\* cited by examiner

*Primary Examiner* — Karl D Frech
(74) *Attorney, Agent, or Firm* — Fitzpatrick, Cella, Harper & Scinto

(57) ABSTRACT

A falsification detection threshold value for falsification detection is automatically determined. A falsification detection portion (4) performs division into uniform detection units, and calculates, for each of the cells of the detection units, the variation information of differential information on respective regions that are included in the detection units and are divided as described above (S802). It is understood that cells (901), (902) and (903) have values of 8, 170 and 140, respectively. The falsification detection portion (4) uses the variations in the differential information calculated in step S802 to calculate a differential information threshold for determining a falsified region within an image read by scanning (S803). The average value and the standard deviation of a region where falsification is not conducted are relatively small, and the average value and the standard deviation of a region where falsification is conducted are relatively large.

7 Claims, 14 Drawing Sheets

READ INFORMATION

IMAGE FEATURE AMOUNT OF READ INFORMATION

FALSIFICATION DETECTION INFORMATION

DIFFERENTIAL INFORMATION

FALSIFICATION DETECTION RESULT

701

FIG.9A DIFFERENTIAL INFORMATION / ACTUALLY FALSIFIED REGION

FIG.9B AVERAGE VALUE MAP OF DIFFERENTIAL INFORMATION

FIG.9C STANDARD DEVIATION MAP OF DIFFERENTIAL INFORMATION

DIFFERENTIAL INFORMATION

ACTUALLY FALSIFIED REGION

ERROR CORRECTION RATIO (%)
MAP OF DIFFERENTIAL INFORMATION

| 0 | 0 | 0 | 0 | 0 | 0 |
|---|---|---|---|---|---|
| 0 | 8 | 2 | 1 | 1 | 0 |
| 0 | 5 | 1 | 1 | 0 | 0 |
| 0 | 0 | 0 | 0 | 0 | 0 |

THRESHOLD VALUE CORRECTION
MAP OF DIFFERENTIAL INFORMATION

| +10 | +10 | +10 | +10 | +10 | +10 |
|---|---|---|---|---|---|
| +10 | -15 | -5 | 0 | 0 | +10 |
| +10 | -10 | 0 | 0 | +10 | +10 |
| +10 | +10 | +10 | +10 | +10 | +10 |

THRESHOLD VALUE OF DIFFERENTIAL
INFORMATION BEFORE CORRECTION

| 50 | 50 | 50 | 50 | 50 | 50 |
|---|---|---|---|---|---|
| 50 | 50 | 50 | 50 | 50 | 50 |
| 50 | 50 | 50 | 50 | 50 | 50 |
| 50 | 50 | 50 | 50 | 50 | 50 |

THRESHOLD VALUE OF DIFFERENTIAL
INFORMATION AFTER CORRECTION

| 60 | 60 | 50 | 50 | 50 | 50 |
|---|---|---|---|---|---|
| 60 | 35 | 45 | 50 | 50 | 50 |
| 60 | 40 | 50 | 50 | 60 | 60 |
| 60 | 60 | 60 | 60 | 60 | 60 |

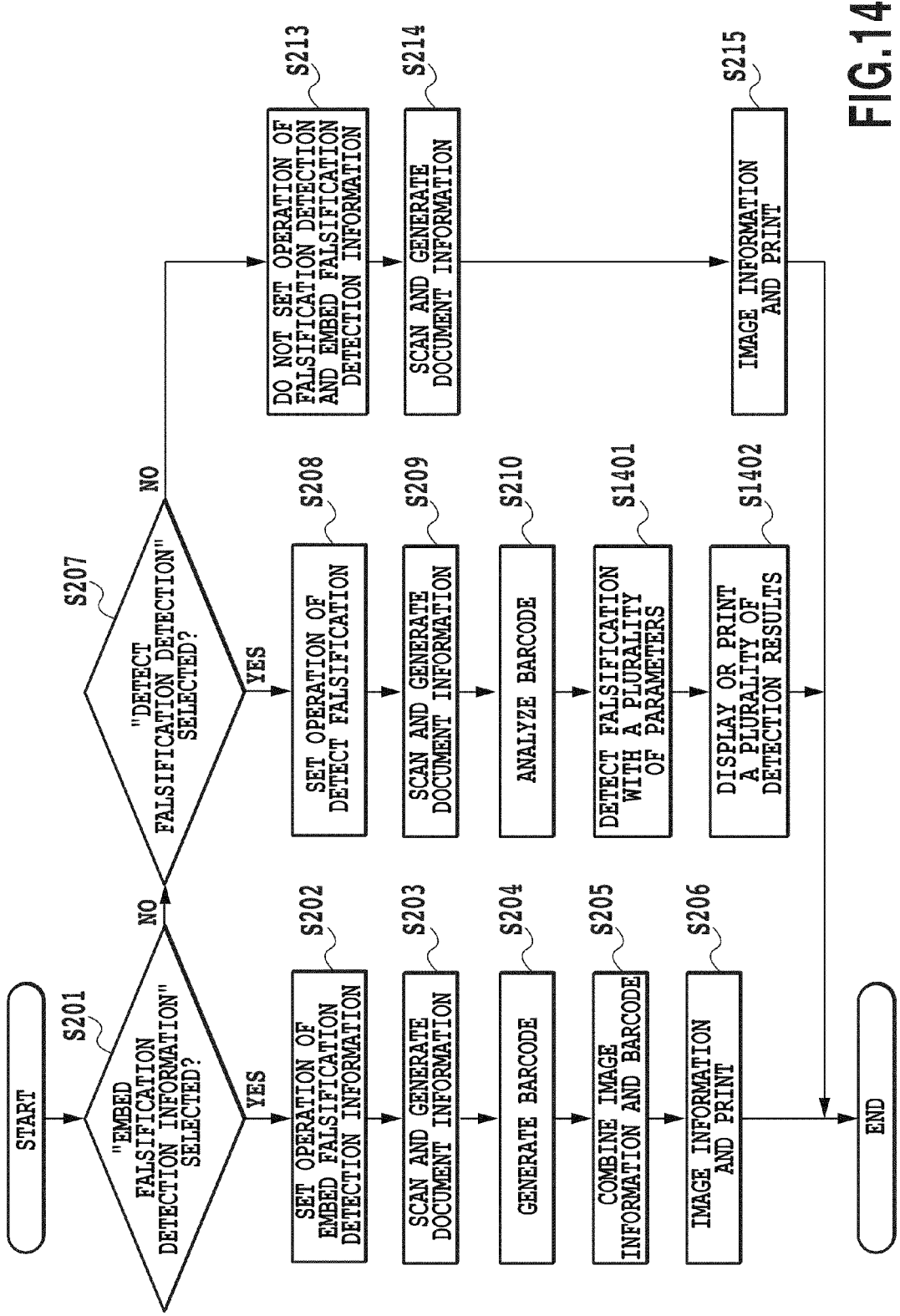

IMAGE FALSIFICATION DETECTION DEVICE AND IMAGE FALSIFICATION DETECTION METHOD

BACKGROUND OF THE INVENTION

1. Field of the Invention

The present invention relates to an image falsification detection device and an image falsification detection method. More particularly, the present invention relates to an image falsification detection device and an image falsification detection method in which, when an original document of interest is produced, falsification detection information reflecting its content is incorporated thereinto, and in which whether or not a read image is falsified is detected by use of the falsification detection information.

2. Description of the Related Art

An original paper document falsification detection technology is becoming important as there has been growing security awareness in recent years (see, for example, a catalog for "Guardian of Paper", security software for printed document, published by Hitachi Government & Public Corporation System Engineering, Ltd. in February 2009). In this technology, an image of interest is first converted into a lower resolution image, the low-resolution image is converted into a barcode, and the original image (the image before being converted into the low-resolution image) and the barcode are printed on paper. Then, the following processing is performed to check whether or not the content of the printed paper is falsified. The paper (also referred to as an original paper document) is scanned, and thus the density of the image within the barcode is compared with that of the image obtained by the scanning. As a result, if, in a certain region, there is a density difference between those images which is equal to or more than a threshold value, the region is determined to be a falsification detection region. For example, the region is determined to be a region in which a person has put information into the above paper in handwriting or has erased part of the image in the region with a correction pen or the like.

However, in the related art of above "Guardian of Paper", in order to appropriately set the threshold value, it is necessary for a user to manually perform adjustment. This imposes a burden on the user.

An object of the present invention is to determine appropriate threshold values for detecting falsification in various original paper documents. For example, the present invention has an object to determine a threshold value for appropriately detecting falsification in an original paper document even when an image in the original paper document is degraded because, for example, the original paper document has been left for a long period of time.

SUMMARY OF THE INVENTION

To achieve the above object, an image falsification detection device according to the present invention includes: a decoding means for extracting, from an image of interest including a falsification detection code generated based on an original document image, the falsification detection code, and for decoding the falsification detection code to acquire falsification detection information; a difference calculation means for calculating a differential image between the falsification detection information acquired by the decoding means and the image of interest; a threshold value calculation means for calculating feature information from the differential image calculated by the difference calculation means, and for calculating a threshold value for determining whether or not a region is the falsified region corresponding to the calculated feature information; and a determination means for determining that, in the differential image calculated by the difference calculation means, a region having a difference larger than the threshold value calculated by the threshold value calculation means is the falsified region.

An image falsification detection method according to the present invention includes: a decoding step of extracting, from an image of interest including a falsification detection code generated based on an original document image, the falsification detection code, and of decoding the falsification detection code to acquire falsification detection information; a difference calculation step of calculating a differential image between the falsification detection information acquired in the decoding step and the image of interest; a threshold value calculation step of calculating feature information from the differential image calculated in the difference calculation step, and of calculating a threshold value for determining whether or not a region is the falsified region corresponding to the calculated feature information: and a determination step of determining that, in the differential image calculated in the difference calculation step, a region having a difference larger than the threshold value calculated in the threshold value calculation step is the falsified region.

With the present invention, it is possible to determine appropriate threshold values for detecting falsification in various original paper documents.

Further features of the present invention will become apparent from the following description of exemplary embodiments (with reference to the attached drawings).

BRIEF DESCRIPTION OF THE DRAWINGS

FIG. 14 is a diagram showing the operational flow of MFP in a fourth embodiment of the present invention.

DESCRIPTION OF THE EMBODIMENTS

Preferred embodiments of the present invention will be described below with reference to the accompanying drawings.

[First Embodiment]

Figure 1:
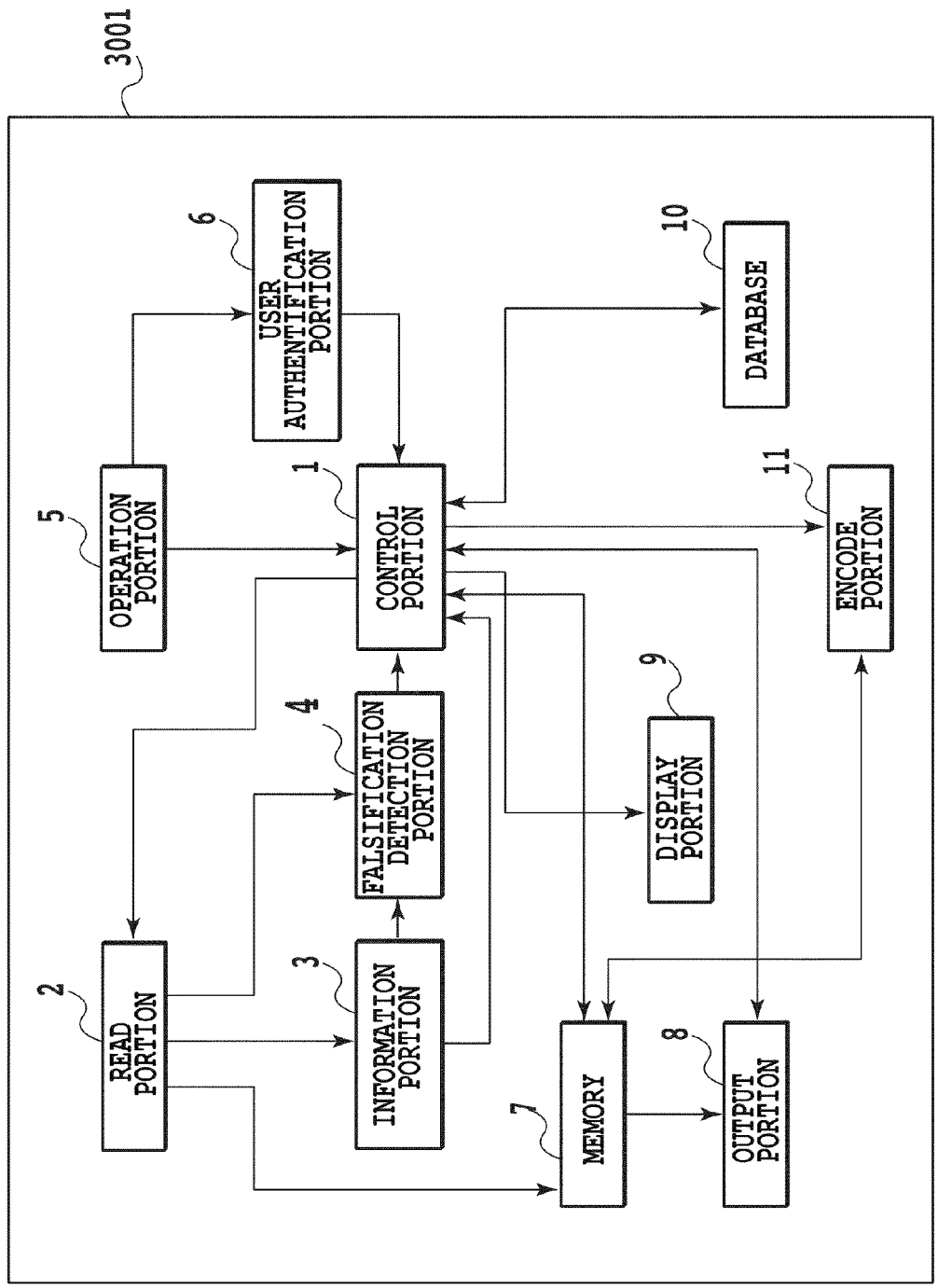
FIG. 1 is a block diagram of MFP in a first embodiment of the present invention.

FIG. 1 is a block diagram showing the configuration of an image forming device (MFP3001 as one example thereof) in the present embodiment.

A control portion 1 controls the respective portions of MFP3001, which is one example of the image forming device in the present embodiment. An operation portion 5 receives an operation/input from a user. A user authentification portion 6 manages the user authentification of a user who uses MFP3001. A read portion 2 scans a printed material to generate read information including falsification detection code information. An information portion 3 acquires information embedded in the printed material from the falsification detection code information included in the read information. A falsification detection portion 4 decodes falsification detection information from the information embedded in the printed material, and detects whether or not document information for an original document image is falsified.

A memory 7 stores the read information acquired by scanning the printed material, which is an image of interest. An output portion 8 reads the read information from the memory 7, and thereafter performs output such as the printing of the read information or the transmission of it to an external device. Here, although examples of the external device include a PC connected through a network to MFP3001, the present invention is not limited to this.

A display portion 9 displays a display screen through control by control portion 1. A database 10 records the settings for MFP3001 and data for logs in any manner known in this technical field. An encode portion 11 previously generates the falsification detection information to detect whether or not the document information has been falsified, adds an error correction code to perform encoding, generates embedded information, converts the embedded information into an image and thus generates the falsification detection code (falsification detection information).

Next, the processing flow of the respective blocks of FIG. 1 will be described with reference to FIG. 2. When the user first inputs a user ID/password into the operation portion 5, the input information is fed from the operation portion 5 to the user authentification portion 6, where a determination is made as to whether or not the input password is appropriate. If the password is determined to be the appropriate password, a notification of the determination and the user ID is provided to the control portion 1.

When the password is confirmed, the control portion 1 causes the display portion 9 to display choices such as "embed the falsification detection information", "detect falsification", and "normal copying". Here, the default choice can be set as normal copying. When the user uses the operation portion 5 to select any of the choices displayed, and provide an instruction for operation, the operation portion 5 feeds the instruction to the control portion 1. Meanwhile, the choice "embed the falsification detection information" is selected from the above choices, or can also be set by a driver or utility of a PC connected to MFP3001.

Figure 2:
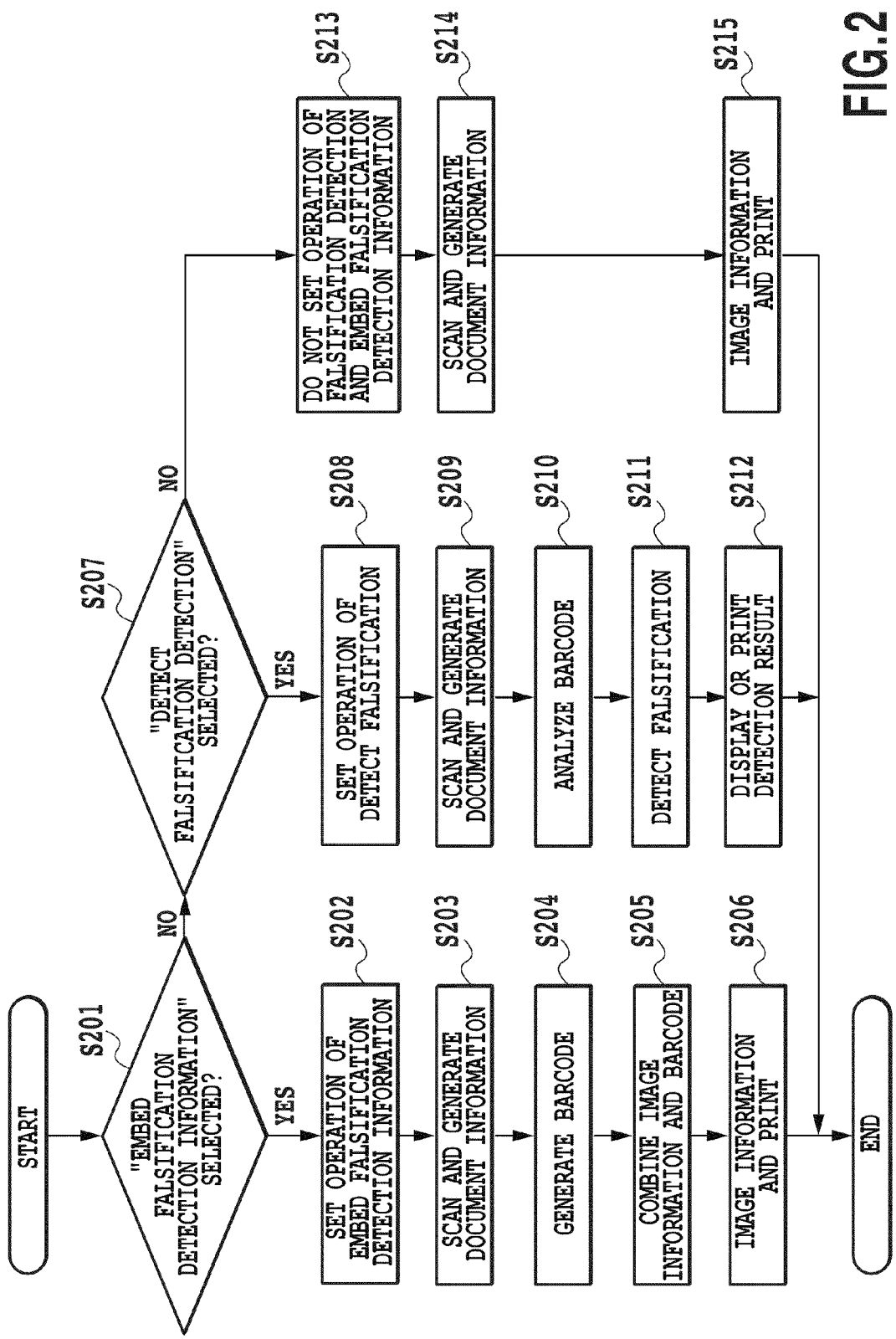
FIG. 2 is a diagram showing the operational flow of MFP in the first embodiment of the present invention.

As shown in FIG. 2, in step S201, the control portion 1 determines whether or not the choice "embed the falsification detection information" is selected. If it is selected, the process proceeds to step S202 whereas, if it is not selected, the process proceeds to step S207. In step S202, the control portion 1 sets the operation for embedding the falsification detection information, notifies the encode portion 11 of the setting, and orders the read portion 2 to scan the printed material.

In step S203, the read portion 2 scans the original document to generate the document information, and transmits it to the memory 7 and the information portion 3. The information portion checks whether or not the falsification detection code is already included in the document information; if it is included, the control portion 1 causes the display portion 9 to display an error display, and the processing is completed.

In step S204, the control portion 1 first obtains the document information from the memory 7, and generates the falsification detection information which is information for falsification detection as described in detail later. Then, the falsification detection information is encoded, the falsification detection code is generated and the embedded information is converted into an image. The falsification detection code thus generated is transmitted to the memory 7. In addition, when the falsification detection code is mentioned in the present invention, the falsification detection code shall refer to an "image in which its information can be expressed in a machine-readable format", such as a so-called conventional barcode, a two-dimensional barcode (such as a QR code, a dot code or LVBC) or watermarking. When the memory 7 receives the falsification detection code and the document information, the control portion 1 causes the process to proceed to step S205, and combines the falsification detection code and the document information to generate the image information. Here, the document information and the falsification detection code may be separately combined on the paper. In step 206, the control portion 1 transmits the image information thus generated from the memory 7 to the output portion 8, and causes the output portion 8 to print it.

If, in step S201, the choice "embed the falsification detection information" is not selected, in step S207, the control portion 1 determines whether or not the choice "detect falsification" is selected. If it is selected, the process proceeds to step S208 whereas, if it is not selected, the process proceeds to step S213.

In step S208, the control portion 1 sets the operation for detecting falsification, notifies the falsification detection portion 4 of the setting, and orders the read portion 2 to scan the printed material. In step S209, the read portion 2 scans the printed material to generate the read information, and transmits it to the memory 7 and the information portion 3. In step S210, the information portion 3 checks whether or not the falsification detection code is already included in the read information and, if it is included, the falsification detection code is converted into information, and the embedded information is acquired.

In step S211, the falsification detection portion receives the embedded information from the information portion 3, decodes the falsification detection information, performs comparison with the read information received from the read portion 2 and determines whether or not it is falsified. Although the falsification detection processing will be described in detail later, the result of the falsification detection obtained by the determination is transmitted to the memory 7. When the memory 7 receives the result of the falsification detection, the process proceeds to step S212, where the result of the falsification detection stored in the memory 7 is displayed on the display portion 9 through the control portion 1. Alternatively, the control portion 1 can generate an falsification detection result display image in which the result of the falsification detection can be visually recognized as an image and store it in the memory 7, and transmit the image from the memory 7 to the output portion 8, where the image can be printed. With respect to the result of the falsification detection, displaying or printing of the result of the falsification detection being present or not present can be performed, or the document information and the falsification detection results converted into an image are combined and thus a place where the falsification is detected can be explicitly displayed or printed.

Meanwhile, if the choice "normal copying" is selected, in step S213, the control portion 1 neither sets the operation for embedding the falsification detection information nor sets the operation for detecting the falsification, and orders the read portion 2 to scan the printed material. In step S214, the read portion 2 scans the printed material to generate the read information, and transmits it to the memory 7. When the memory 7 receives the document information, the process proceeds to step S215, and the control portion 1 transmits the generated read information as the image information from the memory 7 to the output portion 8, where it is caused to be printed.

Figure 5:
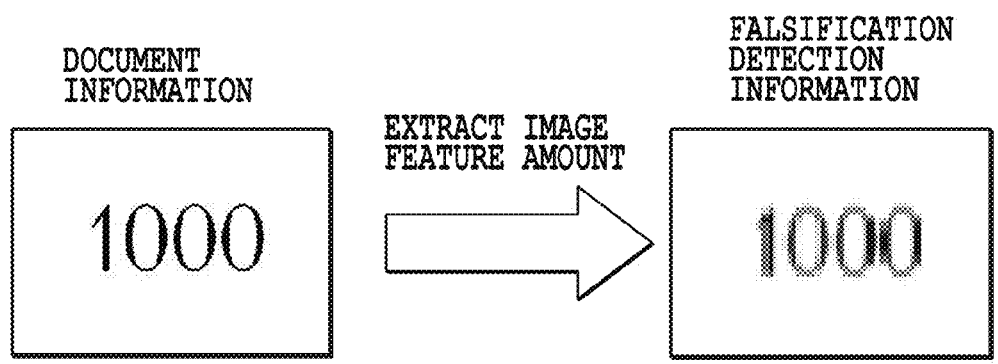
FIG. 5 is a diagram illustrating the extraction of falsification detection information from document information in the embodiment of the present invention.

Next, a method of generating the falsification detection information will be described. The falsification detection information is information which is previously generated based on the document information for the original document image and embedded in the printed material together with the document information, in order to detect the falsification of the printed material. Although ideally the document information itself before being printed is preferably used as the falsification detection information, since it has an enormous amount of information, the falsification detection information generated based on the document information before being printed is used. For example, an A4 color image of 600 dpi has a capacity of about 100 MB. Hence, in general, when the falsification detection information is coded, is combined with document information and is printed, since a large volume of falsification detection information cannot be printed, it is required to reduce the volume of data on the falsification detection information itself in terms of the volume. Meanwhile, even when the falsification detection information is stored in a server, it is likewise required to reduce data in terms of the capacity of the server. Therefore, as shown in FIG. 5, the encode portion 11 extracts an image feature amount from the document information as the falsification detection information, and uses it as the amount of information that can be converted into the falsification detection information code. Naturally, when high-precision falsification detection is required, the document information itself is regarded as the image feature amount, and it may be used as the falsification detection information.

When falsification is detected, whether or not falsification is present is determined by comparing the falsification detection information (the image feature amount before being printed) included in the falsification detection code for the read information with the image feature amount calculated from the read information. As the method of extracting the image feature amount, for example, the document information is divided into blocks in units of 16 pixels, the image feature amount for each block (for example, an average density for each block) is calculated, and the total of the image feature amounts for each block is set as the falsification detection information. As the image feature amount, an average density, an edge feature, a moment feature, a frequency feature or the like for each block can be used. In an example shown in FIG. 5, the average density is used as the image feature. Since it is highly likely that redundancy is left in the falsification detection information thus calculated, the falsification detection information is compressed by a know manner such as ZIP compression, and the compressed information may be used as the final falsification detection information.

Next, one example of a method of encoding the falsification detection information and thereafter converting the encoded falsification detection information into readable image data will be described. The encode portion 11 performs encoding by adding an error correction code serving as error detection information to the falsification detection information, the encoded falsification detection information is converted into the embedded information and is converted into the falsification detection code that can be thereafter read. The falsification detection code used in this specification is a low-density falsification detection code in which its information is expressed by adding dots to the entire printed surface. With this type of low-density falsification detection code, it is possible to incorporate the falsification detection information without significantly degrading the quality of the printed material. Since the dots are embedded in the entire surface of the printed material, even though the falsification detection code is of low density, the information of a few kilobytes can be embedded as the practical amount of information excluding the error correction code. A specific example of a method of embedding the falsification detection code used in the present embodiment will be described below with reference to FIGS. 3 and 4. The present invention is not limited to this method, and any method known in this technical field can be used.

Figure 3:
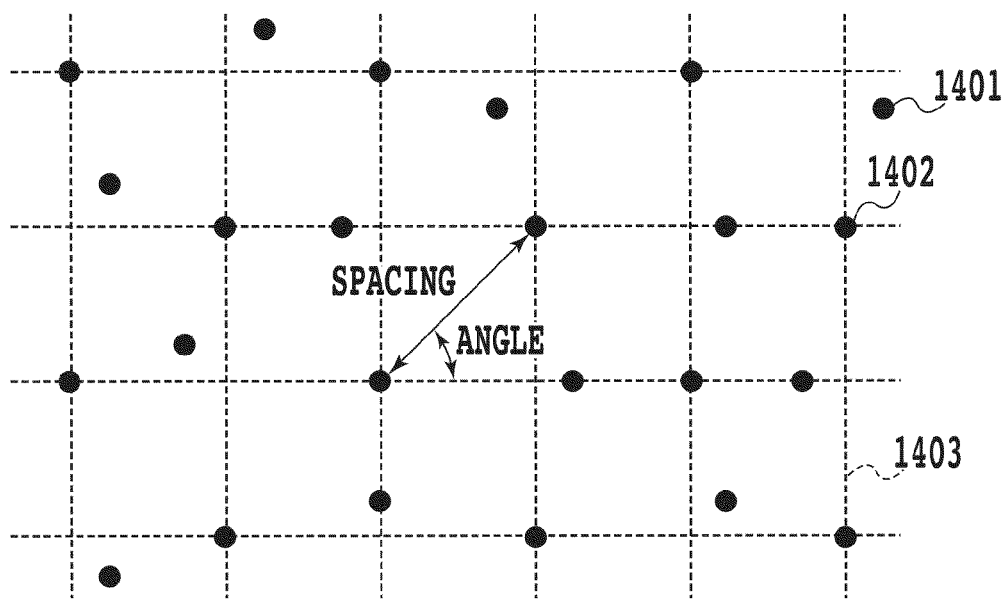
FIG. 3 is a supplementary diagram illustrating a barcode in an embodiment of the present invention.

FIG. 3 is a diagram showing the dots included in the falsification detection code. The dots included in the falsification detection code include information dots 1401 and arrangement dots 1402. The arrangement dots 1902 are regularly spaced on an imaginary reference grid 1403 indicated by dotted lines, that is, are present at the intersections of the lines of the reference grid 1403. The information dots are added to positions displaced from the intersections of the lines of the reference grid 1403. The falsification detection information is expressed by how the position of the information dot is displaced from that of the arrangement dot (intersection of the lines of the reference grid). In other words, when the embedded information obtained by encoding the falsification detection information is converted into a readable image, the falsification detection code including the information dots 1401 and the arrangement dots 1402 are acquired. Although the reference grid is represented by the dotted lines in FIG. 3, the dotted lines are lines that are not actually printed. One example of a method of finding the lines of this imaginary reference grid and obtaining the embedded information in the present embodiment will be described with reference to FIG. 4. The present invention is not limited to this method, and any method known in this technical field can be used.

Figure 4:
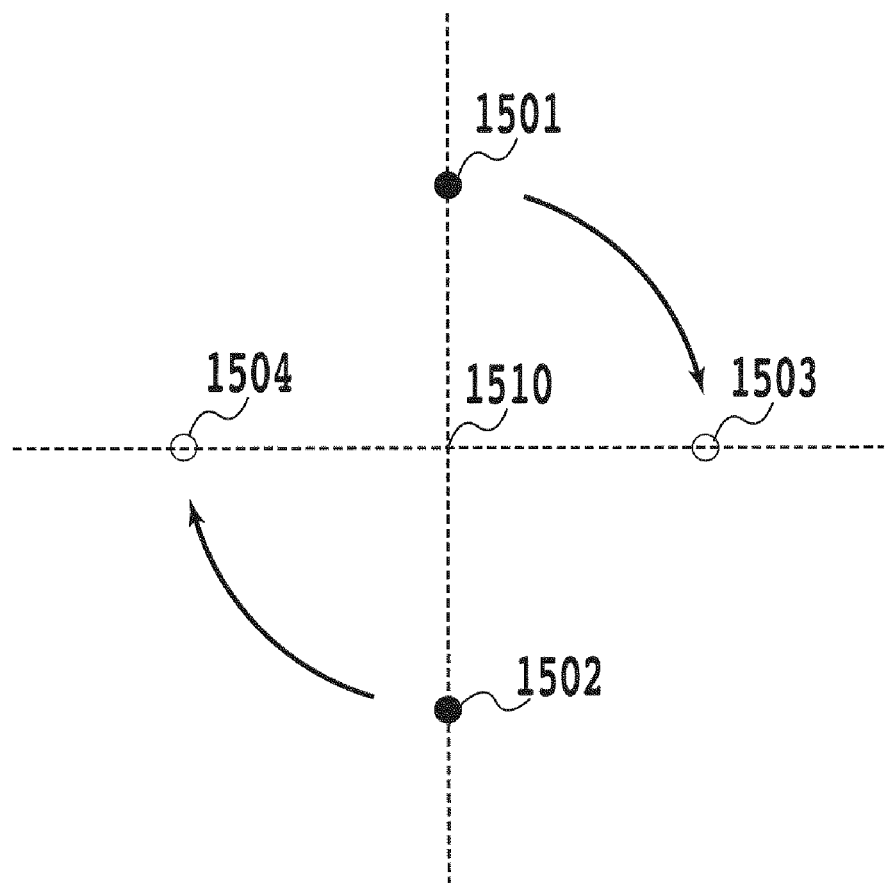
FIG. 4 is a diagram illustrating the correction of a grid rotation angle in the embodiment of the present invention.

As shown in FIG. 4, the information portion 3 arbitrarily selects a dot 1501, and arbitrarily selects a dot 1502 around the selected dot. Then, the information portion 3 rotates the positions of the selected dots 1501 and 1502 by 90 degrees by centering on the center point 1510 of both dots. If dots 1503 and 1504 are present at the position obtained by the rotation, the information portion 3 determines that the selected dots are the arrangement dots that would be present at regular intervals vertically and horizontally.

On the other hand, if the dots 1503 and 1504 are not present, the information portion 3 determines that the selected dots are the information dots that are randomly present. In this way, the information portion 3 finds two arrangement dots, and utilizes constraint conditions that the arrangement dots are present at regular intervals vertically and horizontally and thereby finds all the other arrangement dots.

After all the arrangement dots are found, the information portion 3 sets the imaginary reference grid on those arrangement dots, finally, the remaining dots, that is, the directions in which the information dots are displaced, are determined from the intersections of the lines of the reference grid, with the result that the embedded information is obtained. In the present embodiment, when the information dot is displaced in an upward direction, a value "0" is assigned, when the information dot is displaced in an upper right direction, a value "1" is assigned and when the information dot is displaced in a rightward direction, a value "2" is assigned. As described above, the encoding is performed such that the values are sequentially increased in a clockwise direction; the present invention is not limited to this method, and any method known in this technical field can be used. When the information dots are lost and thus information is not acquired, this fact is recorded.

Figure 6:
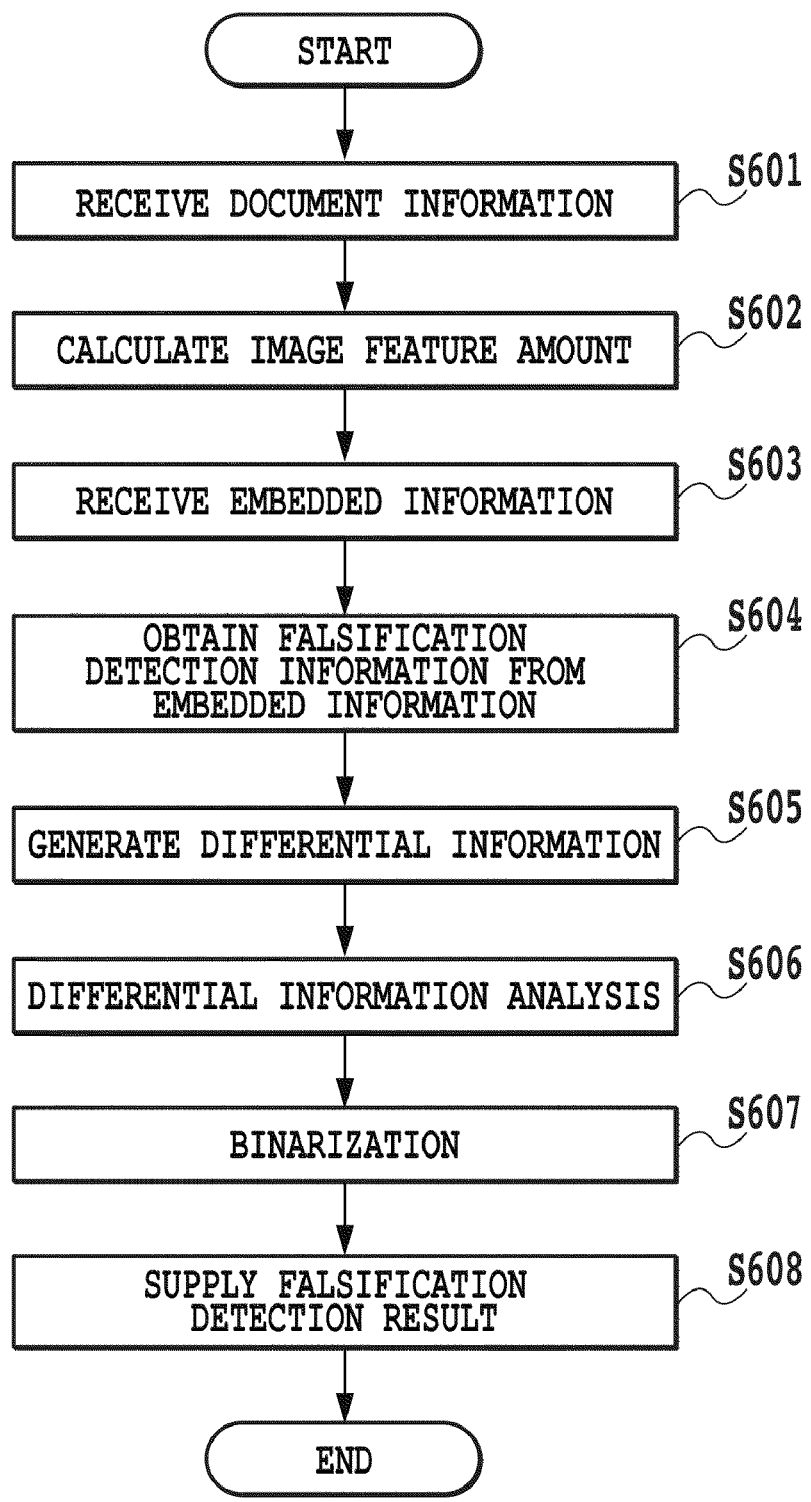
FIG. 6 is a diagram illustrating a falsification detection flow in the first embodiment of the present invention.

Next, the falsification detection processing performed in step S211 will be described in detail with reference to FIG. 6.

The falsification detection portion 4 first receives from the read portion 2 the read information obtained by scanning the printed material (S601). An example of the read information received is "read information" shown in FIG. 7A. Then, the falsification detection portion 4 calculates the image feature amount from the read information received (S602). The image feature amount is calculated in the same manner as the falsification detection information embedded as the falsification detection code in the read information scanned is calculated. The "image feature amount for the read information" of FIG. 7B snows as an image an example of the image feature amount calculated from the "read information" of FIG. 7A. In the present embodiment, the falsification detection information is set as an average density for each block, and thus the image feature amount is the total of the average densities for the respective blocks.

On the other hand, the falsification detection portion 4 acquires from the information portion 3 the embedded information obtained by converting into binary data the falsification detection code determined from the falsification detection code image obtained by scanning (S603). The falsification detection portion 4 performs error correction on the embedded information, and decodes the falsification detection information (S604), and, when the falsification detection information is compressed, it is decompressed. Furthermore, when the embedded information is composed of data obtained by the repetition of the same data a plurality of times due to redundancy, it is possible to perform error correction on the data by integrating the portions repeated a plurality of times and thus expressing them as one piece of data or a probability value.

Figure 7A:
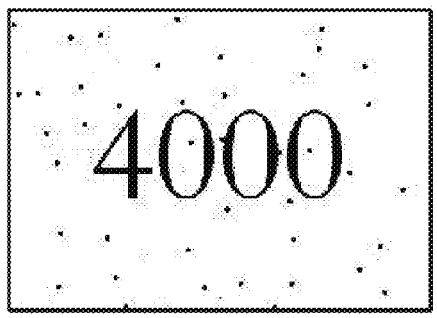
FIG. 7A is a conceptual diagram of falsification detection in the first embodiment of the present invention.
Figure 7B:
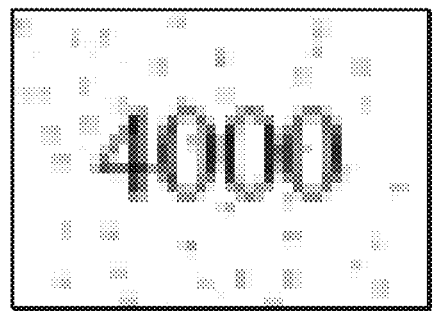
FIG. 7B is a conceptual diagram of falsification detection in the first embodiment of the present invention.
Figure 7C:
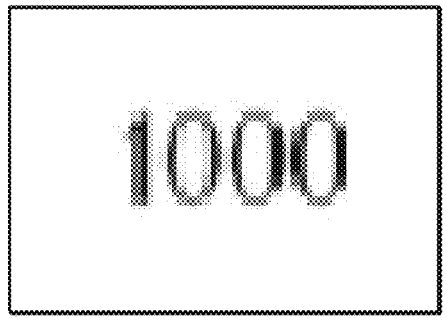
FIG. 7C is a conceptual diagram of falsification detection in the first embodiment of the present invention.

In FIG. 7C, an example of the "falsification detection information" is shown as an image. Specifically, this "falsification detection information" is the total of the average densities for the respective blocks. This "falsification detection information" is information that is generated in step S204. Then, the falsification detection portion 4 serving as a differential calculation means calculates differential information for a differential image (S605). The differential information is the absolute value of the difference between the image feature amount for the read information obtained as described above (that is, the image feature amount calculated in step S602) and the falsification detection information (that is, the information obtained in step S604), which is the image feature amount for the document information before being printed.

Figure 7D:
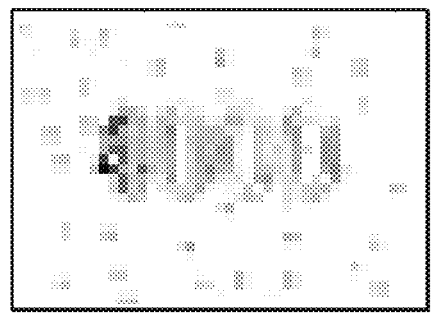
FIG. 7D is a conceptual diagram of falsification detection in the first embodiment of the present invention.
Figure 7E:
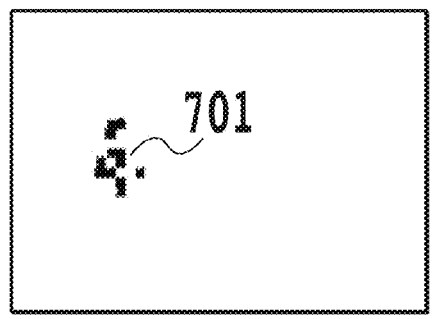
FIG. 7E is a conceptual diagram of falsification detection in the first embodiment of the present invention.

If the document information is falsified after the printing, this differential information should be increased, and when comparison is performed on each of the blocks, the region where the value of the differential information is large can be considered to be a region where falsification is very likely to be performed. The "differential information" of FIG. 7D shows an example of differential information generated based on the "image feature amount for the document information" of FIG. 7B and the "falsification detection information" of FIG. 7C. In FIG. 7D, the differential information is expressed as density information by using an image. Namely, a region where the difference is small is represented as a white region, and information in which the difference is large is represented as a black region. In this example, "1000" is rewritten into "4000", and it can be seen that the portion of "4" that is falsified has a large difference.

Figure 8:
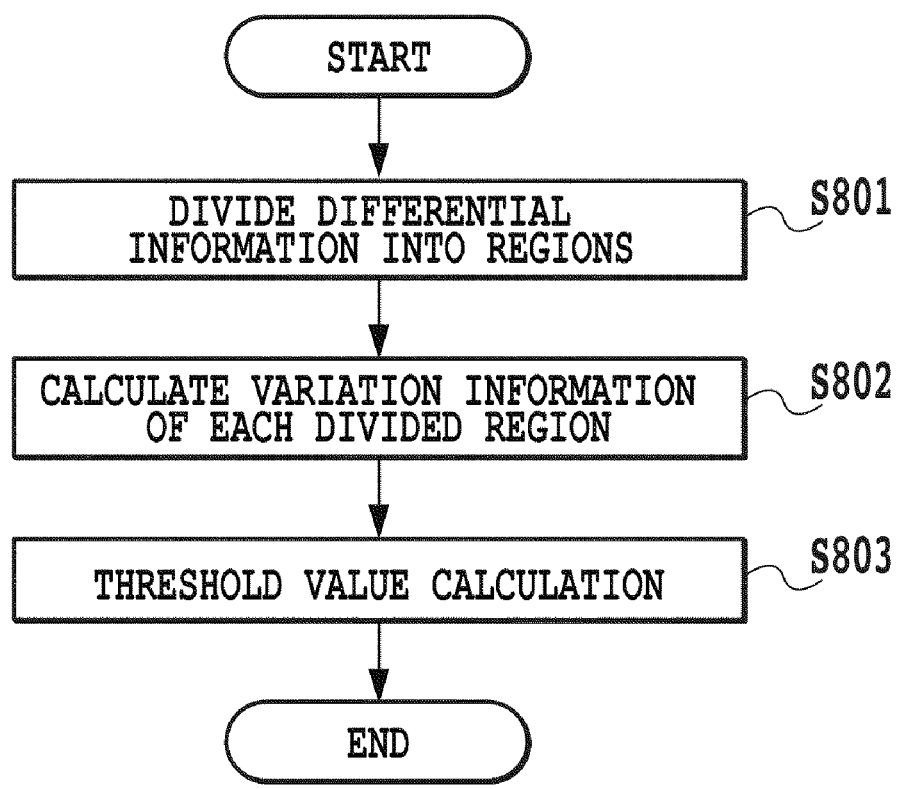
FIG. 8 is a diagram illustrating a differential information analysis flow in the first embodiment of the present invention.

Based on the differential information described above, the falsification detection portion 4 analyzes the differential information (S606). The differential information itself is simply multivalued information, and whether or not falsification is carried out is not indicated by the differential information alone. Hence, the differential information, which is multivalued, is binarized, the region is divided into a region where falsification may be carried out and a region where no falsification is carried out and a falsification region is determined. In order to do so, it is necessary to determine an appropriate threshold value for division into the region where falsification may be carried out and the region where no falsification is carried out. In the present invention, the threshold value for performing the binarization is automatically determined. Namely, whether variations indicated by the differential information is caused by falsification or simply by the change in the surface condition of the printed material is clarified by analyzing the differential information and determining the threshold value for the binarization. That is, in step S606, processing for determining the threshold value for this purpose is performed, and the processing for determining the threshold value will be specifically described below with reference to FIG. 8.

Before this processing is described in detail, the reason why such processing is considered to be performed will be described.

A difference is absolutely present between an image (an image on the printed material after the falsification detection code is embedded) on the printed material on which falsification detection is performed and an image included in the falsification detection code. For example, since the entire printed material on which falsification detection is performed is stained, a difference is inevitably present between both images. Alternatively, a difference is inevitably present between both images because, for example, the image quality of the entire printed material is aged (degraded over time), a scanner that scans the printed material has a low quality, or an extra falsification code is included in the printed material.

Hence, a difference that is not related to falsification is required to be distinguished from a difference caused by falsification. The former difference should be small, and the latter difference should be large. The threshold value is therefore determined, and a block having a difference smaller than the threshold value is determined to be the former block that is not falsified, and a block having a difference larger than the threshold value is determined to be the latter block that is falsified.

Meanwhile, in the present embodiment, this threshold value is determined from a calculation formula of "value (average value) obtained by averaging differences in a plurality of blocks that are not falsified+standard deviation of the difference×n (for example, n=3)". When this type of threshold value is used, about 99.73% of blocks that are not falsified statistically (see, for example, paragraph [114] in Japanese Patent Laid-Open No. 2009-259436) have differences smaller than the threshold value.

Hence, the binarization performed by using this threshold value allows the identification of only the blocks that are falsified. Even the blocks that are not falsified are determined to be falsified at a probability of 0.27%, but since this probability is very low, this fact is allowed in the present embodiment.

In the method described above, in determining the threshold value, it is necessary to first identify a plurality of blocks that are not falsified. In the present embodiment, blocks that have a low standard deviation and are included in a division region described later are identified as the blocks that are not falsified, as described above. This is because the following way of thinking is adopted.

The fact that a falsified block is present in a certain division region should indicate that the standard deviation of the division region is large. Hence, in a division region whose standard deviation is small, blocks that are not falsified should only be present.

First, the falsification detection portion 4 first calculates, based on the differential information obtained in step S605, differential information for each of equally divided regions (region sufficiently larger than a block composed of 16 pixels; hereinafter referred to as the division region) (S801). The division into the regions can be performed in units of an arbitrary number of pixels, and for example, it can be performed in units of about a few hundred to a few thousand pixels.

Figure 9:
FIG. 9A is a conceptual diagram of differential information analysis in the first embodiment of the present invention.
FIG. 9B is a conceptual diagram of differential information analysis in the first embodiment of the present invention.
FIG. 9C is a conceptual diagram of differential information analysis in the first embodiment of the present invention.

As with cells 901 and 902 shown in FIG. 9B, the falsification detection portion 4 divides an image into uniform detection units, and calculates, as feature information, variation information of the differential information of respective division regions included in each cell, that is, each of the detection units, on a cell-by-cell basis (S802). In the present embodiment, the average values of the differential information within each division (value obtained by averaging the differential information of the respective blocks included in each region) and standard deviations are calculated as the variation information. However, the present invention is not limited to this, and it is possible to use, as the variation information, any index indicating how much the differential information varies in the cell serving as the detection unit. Dotted lines in FIGS. 7A to 7C represent region boundaries that divide the detection units, and the numbers for the detection units shown in FIGS. 9B and 9C represent the average values and the standard deviations of the differential information of the respective blocks included in each of the detection units. For example, it is understood from FIG. 9B that cells 901, 902 and 903 have average values of 8, 170 and 140, respectively. The same applies to a standard deviation map shown in FIG. 9C.

After calculating the variation information in this way, the falsification detection portion 4, which is a threshold value calculation means, makes use of the variations in the differential information calculated in step S802 and calculates the threshold values on the differential information for determining a falsification region within the image obtained by scanning and reading the image (S803). In FIGS. 9A to 9C, the average value and the standard deviation are relatively small in the division region where falsification is not carried out, and the average value and the standard deviation are relatively large in the division region where falsification is carried out. It is therefore possible to obtain a binarized threshold value for the differential information by effectively utilizing the above-described variation information. For example, the following method can be considered.

1. Calculation of the Standard Deviation and the Average Value for Determining the Threshold Value In a division region of an upper X % standard deviation (division region where a standard deviation is relatively large), falsification may be carried out. On the other hand, in a division region having a lower (100−X) % standard deviation (that is, a division region where a standard deviation is relatively small), it is likely that falsification is not carried out. Hence, by the use of the standard deviations of a plurality of division regions where standard deviations are relatively small, the standard deviation for determining the threshold value is determined. Specifically, the average value of the standard deviations of the division regions is set as the standard deviation for determining the threshold value. Here, since a division region in which its original region is a white region and a scanned original document is also a white region is supposed to have a small differential value, such a division region may be excluded.

On the other hand, the average values of the differential values in the respective division regions are averaged, and thus the resulting value is set as the average value for determining the threshold value.

2. Determination of the Threshold Value

The threshold value is determined from the calculated standard deviation and average value for determining the threshold value.

Threshold value=Average value for determining the
threshold value+Standard deviation for determining the threshold value×$n$ Here, "n" represents a predetermined value dependent on a permissible erroneous detection ratio or detection failure ratio. When the erroneous detection is desired to be reduced, the "n" has only to be decreased. But, the detection failure is more likely to occur. By contrast, when the detection failure is desired to be reduced, the "n" has only to be increased. But, the erroneous detection is more likely to occur. Normally, although this "n" can be previously determined, the "n" is also set at a variable value. Thus, as compared with the case where the "n" is previously fixed, it is possible to flexibly set the threshold value and adapt it to various conditions. Alternatively, the "n" may be varied according to the shape of a histogram (such as monomodal or multimodal) of the entire differential information or may be set as a variable for the standard deviation of the entire differential information. The histogram of the differential information refers to one in which the horizontal axis represents the value of the differential information and the vertical axis represents the frequency of each differential value.

The above method assumes a general case where most of the original document is not falsified and a differential information value for a region that is not falsified results from noise. In this way, it is possible to automatically determine the binarized threshold value from the variation information of the differential information. It is considered that examples of the information for expressing variations in differences between image features include information on the local maximum point/local minimum point of a histogram of the entire differential information, information on the minimum value/maximum value of the differential information for each of the division regions, and the values of the upper A %/lower A % (A is an arbitrary value) of the entire differential information.

As a result of the processing described above, the falsification detection portion 4 makes use of the threshold value obtained by the differential information analysis processing in step S606 to binarize the differential information (S607). As a result of the binarization, a region having differential information larger than the threshold value is estimated to be a falsified region. A region having differential information smaller than the threshold value is estimated to be a region that is not falsified. Namely, if the constant threshold value is determined, the portions indicated by the cells 902 and 903 are determined to be division regions including falsified blocks, as shown in FIG. 9B. With reference to FIGS. 7A to 7E, FIG. 7E representing "falsification detection result" is an example of an image obtained by binarizing "differential information" in FIG. 7D with the threshold value determined in step S606. A region 701 represented by black marks indicates a falsified region, and it can be understood from the image of the binarized block that "1" is rewritten into "4".

After the binarization processing is performed, the falsification detection portion 9 transmits information on the result of the falsification detection to the memory 7 (S608). The information transmitted as the result of the determination is information as to whether or not falsification is conducted and the falsified region. The information on the falsified region may be transmitted either as coordinate information or as the image itself obtained by the binarization.

[Second Embodiment]

Next, a second embodiment will be described with reference to the accompanying drawings. Among the drawings referenced in the present embodiment, the description of the configuration diagrams and the flowcharts already discussed in the first embodiment will be omitted. The present embodiment differs from the first embodiment in the falsification detection processing in step S211 shown in FIG. 2, and the second embodiment will be described with reference to FIG. 10 showing the detailed flow therefor.

Figure 10:
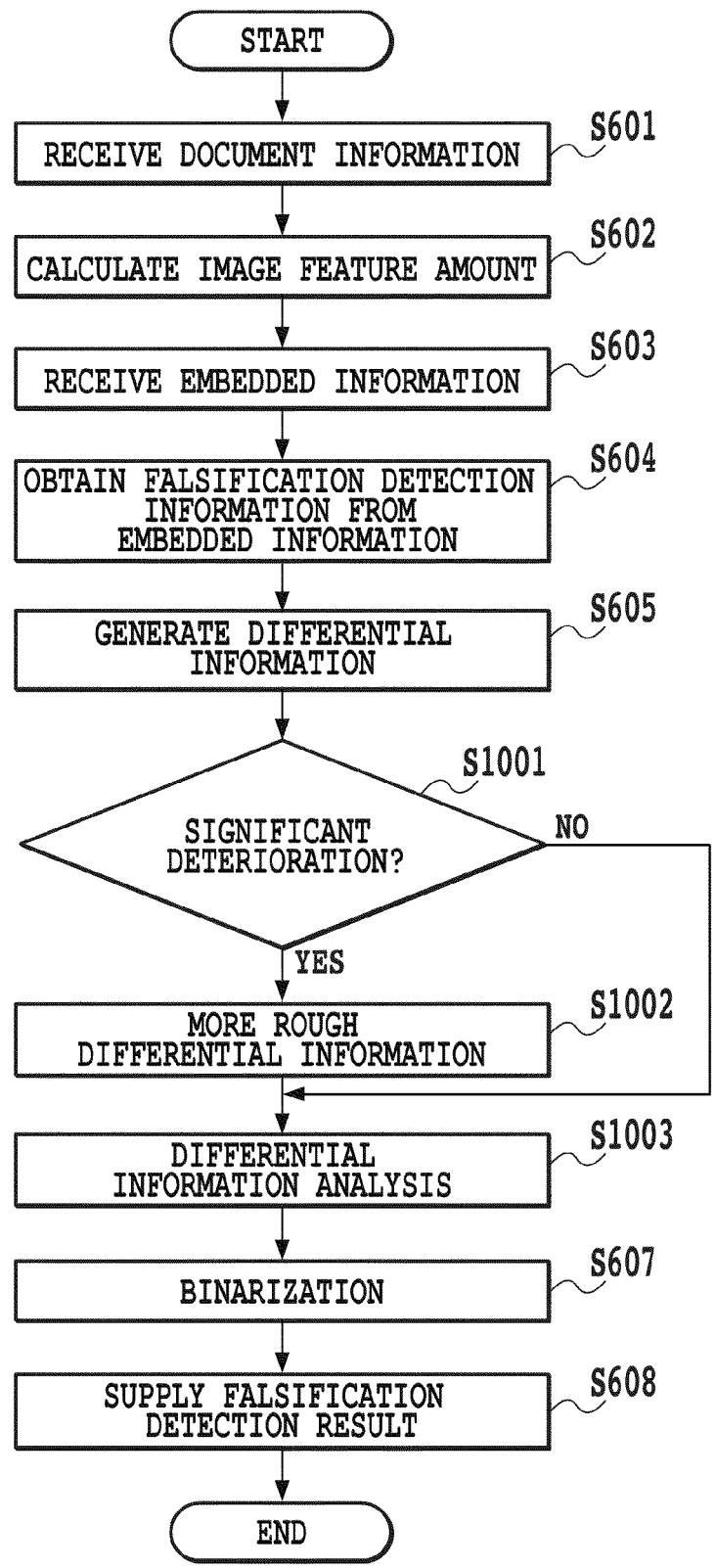
FIG. 10 is a diagram illustrating a falsification detection flow in the second embodiment of the present invention.

Since the processing performed in steps S601 to S605, S607 and S608 shown in FIG. 10 is the same as in the first embodiment, its description will be omitted. After the differential information is generated, the falsification detection portion 4 determines the degree of deterioration of the read information obtained by the scanning (S1001). If the degree of deterioration is determined to be large, the process proceeds to step S1002 whereas, if the degree of deterioration is determined not to be large, the process proceeds to step S1003. When the degree of deterioration of the read information is large, even in a part where falsification is not carried out, its differential information is likely to be large. In this case, when a priority is given to the acquisition of a high detection rate, an erroneous detection rate is increased whereas, when a priority is given to the acquisition of a low erroneous detection rate, a detection failure rate is increased. In order for this to be avoided, in the present invention, the degree of deterioration of the read information is determined, and processing corresponding to the degree of deterioration is performed. Examples of a method of determining the degree of deterioration of the read information are described blow.

1. Calculation from the Read Information Itself

A white region in paper is acquired from the falsification detection information, and the degree of deterioration is determined based on the standard deviation for the white region in paper.

2. Calculation from Data when the Falsification Detection Code is Decoded (1) When a ratio of embedded information that cannot be read due to the loss of information dots resulting from the deterioration of the printed material relative to originally embedded information dots is a certain value or more, the degree of deterioration is determined to be high.

(2) When a ratio of the detection information obtained by performing the error correction processing at the time of decoding relative to the whole of the information including information whose error is not corrected is a certain value or more, the degree of deterioration is determined to be high.

3. Calculation from the Differential Information (1) The degree of deterioration is determined based on the shape of a histogram (the horizontal axis represents the differential information of the read information for each pixel, and the vertical axis represents the number of pixels including the differential information) of the differential information. For example, when the shape of the histogram is monomodal and extends significantly, it is likely that the difference caused by falsification cannot be separated from that caused by deterioration.

(2) The degree of deterioration is determined based on the standard deviation of the entire differential information.

(3) The degree of deterioration is determined based on the average value of the entire differential information.

By the use of the method described above, the degree of deterioration of the read information is determined.

Figure 11:
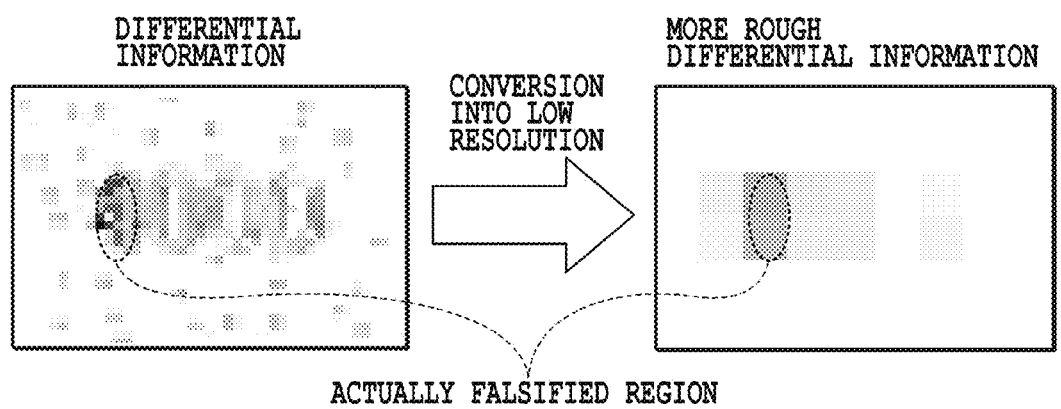
FIG. 11 is a conceptual diagram of the lowering of resolution of differential information in the second embodiment of the present invention.

If, in step S1001, the deterioration is determined to be significant, the falsification detection portion 4 increases the unit for dividing the blocks to calculate the image feature amount, determines a rough image feature amount and calculates more rough differential information (S1002). The differential information caused by deterioration is noise; its region can be considered to be smaller than the actual falsification region. Hence, by calculating the more rough differential information, a region having a large difference due to falsification is made noticeable as compared with a region having a large difference due to image deterioration. Specifically, based on the image feature amount obtained from the falsification detection information, the conversion into a lower-resolution image feature amount is performed, the image feature amount is calculated from the read information with the same low resolution, and the differential information is acquired. In this regard, it is understood from FIG. 11 that the region where falsification is actually carried out is clearly distinguished from other regions due to the rough differential information.

Although the processing in step S1003 is the same as that in step S606 in the first embodiment, the rough differential information obtained in the present embodiment is used for the selection of the division region that is used for acquisition of the standard deviation for determining the threshold value and the average value. Either the differential information generated in step S605 itself or the rough differential information generated in step S1002 can be used for the threshold value determination processing other than the selection of the division region.

By the use of the processing of the present embodiment described above, it is possible to make, even when the printed material to be determined whether or not falsification is carried out is degraded, the determination to perform proper processing, and to thereby determine a region where falsification is carried out.

[Third Embodiment]

Next, a third embodiment will be described with reference to the accompanying drawings. Among the drawings referenced in the present embodiment, the description of the configuration diagrams and the flowcharts already discussed in the first embodiment will be omitted. The third embodiment differs from the first embodiment in the differential information analysis processing in step S606, and the third embodiment will be described with reference to FIG. 12 showing the detailed flow for the differential information analysis in step S606.

Figure 12:
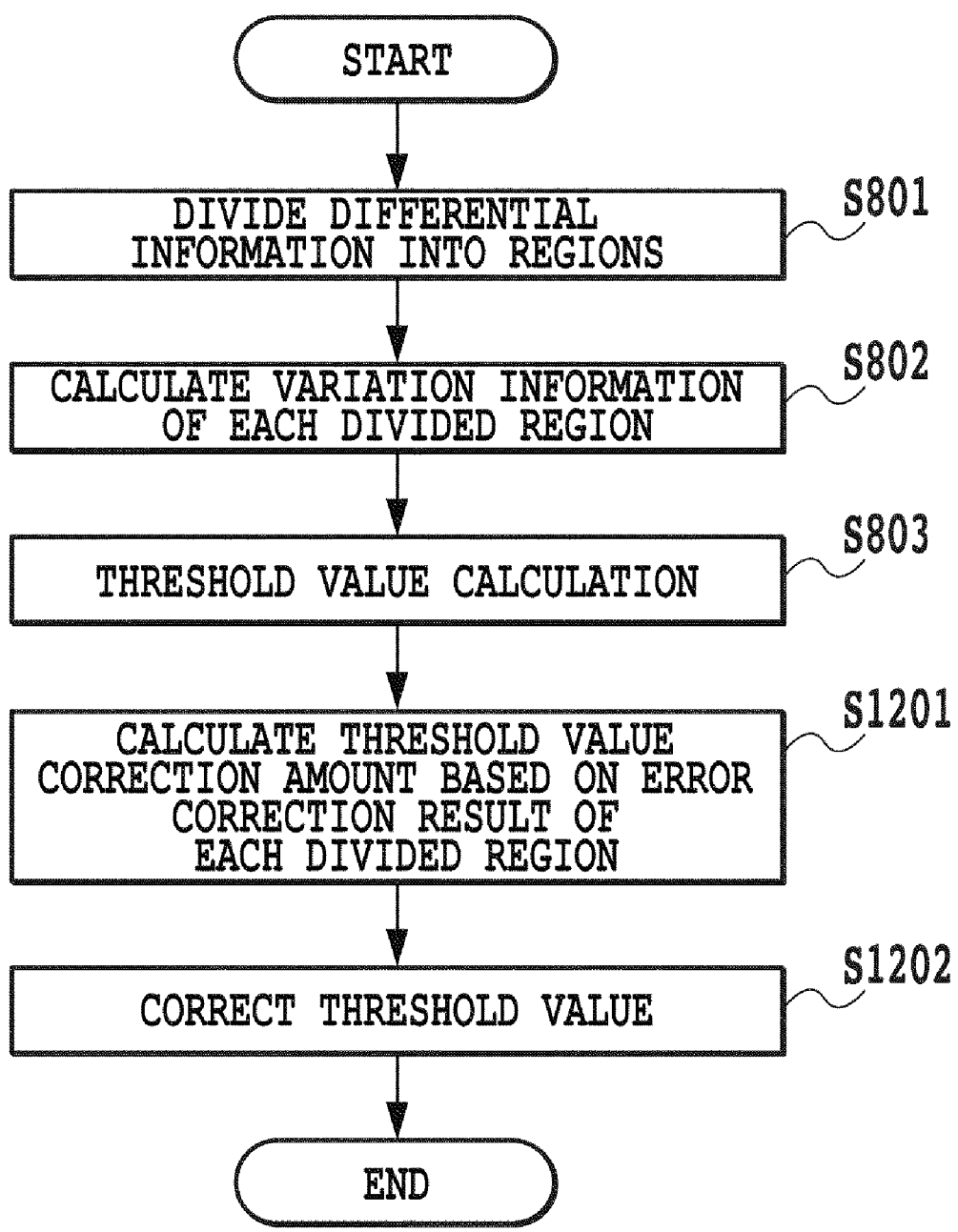
FIG. 12 is a diagram illustrating a differential information analysis flow in a third embodiment of the present invention.

Since the processing performed in steps S801 to S803 among the processing of the flowchart shown in FIG. 12 is the same as in the first embodiment, its description will be omitted.

In step S1201, the falsification detection portion 4 calculates a threshold value correction amount by the use of an error correction ratio of the falsification detection code in each of the division regions divided by the processing in S801. In general, a part where a large number of error corrections of the falsification detection code are performed is more likely to be falsified. Hence, the image is divided into uniform regions, an error correction ratio is calculated for each of the regions and the correction amount of the threshold value calculated in step S803 is calculated. Therefore, in step S609, an error correction is performed on the embedded information, the falsification detection information is decoded, and the embedded information obtained, the embedded information on which the error correction has been performed, and the physical position information of the embedded information are used. Specifically, the embedded information included in each of the division regions is determined, the embedded information is compared with the embedded information on which the error correction has been performed, and thus the error correction ratio for each of the division regions is determined. Then, the error correction ratio for each of the division regions is used, and thus the correction amount of the threshold value is calculated. Examples of an equation for calculating the correction amount can include the following equation.

Correction amount=$G$×(Average error correction ratio for all regions−Error correction ratio for the region)÷Standard deviation of error correction ratio for all regions Here, "G" represents a parameter for adjusting the correction amount.

When the error correction ratios for the respective division regions are about the same, in the above equation, the correction amount of each of the division regions for a region where the error correction ratio is low is not large. By contrast, when the error correction ratios for the respective division regions significantly differ from each other, a large correction amount is obtained depending on the region. In another aspect, information on the density of the read information for each of the division regions may be added to a variable to calculate the correction amount. In general, since the error correction tends to increase with the increase in the density of the read information, a correlation between the error correction ratio and the falsification region changes depending on the density of the read information.

Figures 13A, 13B, 13C, 13D, 13E:
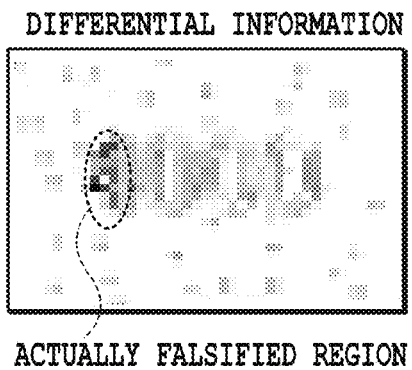
FIG. 13A is a conceptual diagram of the correction of a threshold value in the first embodiment of the present invention.
FIG. 13B is a conceptual diagram of the correction of the threshold value in the first embodiment of the present invention.
FIG. 13C is a conceptual diagram of the correction of the threshold value in the first embodiment of the present invention.
FIG. 13D is a conceptual diagram of the correction of the threshold value in the first embodiment of the present invention.
FIG. 13E is a conceptual diagram of the correction of the threshold value in the first embodiment of the present invention.

FIGS. 13A to 13E are diagrams for conceptually explaining the calculation of the correction amount of the threshold value in step S1201. FIG. 13A showing "differential information" is an example of differential information used in the present embodiment, and FIG. 13B showing "differential information error correction ratio (%) map" indicates an error correction ratio for each of the divided regions as a percent. FIG. 13C showing "differential information threshold value correction map" is a diagram obtained by calculating a threshold value correction amount from the error correction ratio for each of the division regions.

In step S1202, the falsification detection portion 4 corrects the threshold value determined in step S803 based on the threshold value correction amount calculated in step S1201 for each of the division regions. By the use of this corrected threshold value, the binarization processing in step S607 is performed. FIG. 13D showing "threshold value before correction of differential information" indicates the threshold value determined in step S803. This value is corrected by the correction amount determined in step S1201, and the resulting threshold value is a "threshold value after correction of differential information" in FIG. 13E. As described above, since the corrected threshold value for the region including a part where falsification is actually carried out is low compared with the other regions, it is easy to extract the falsified part even when extraction using the differential information alone is difficult to be performed.

[Fourth Embodiment]

Next, a fourth embodiment will be described with reference to the accompanying drawings. The description of the configuration diagrams and the flowcharts common to the first embodiment will be omitted. The present embodiment will be described with reference to FIG. 14 showing the flowchart of the fourth embodiment.

Since the processing performed in steps S201 to S210 in the flowchart shown in FIG. 14 is the same as in the first embodiment, its description will be omitted. In step S1401, the falsification detection portion 4 receives the embedded information from the information portion 3, decodes the falsification detection information, compares the resulting information with the read information received from the read portion 2 and detects a plurality of times whether or not falsification is conducted. In the present embodiment, the falsification detection processing performed in step S211 is conducted a plurality of times. Here, by any of the methods of the first to third embodiments, a plurality of threshold values for falsification detection is calculated by using a plurality of internal parameters, and the falsification detection processing is performed a plurality of times by the use of the calculated threshold values for falsification detection. A plurality of falsification detection results obtained is transmitted to the memory 7.

Thereafter, when the control portion 1 detects the reception of the falsification detection results by the memory 7, the control portion 1 displays on the display portion 9 the falsification detection results, stored in the memory 7 and obtained by performing the falsification detection a plurality of times (S1402). Alternatively, the control portion 1 processes the falsification detection results as an image to generate image output data, stores it in the memory 7 and transmits the image output data from the memory 7 to the output portion 8, where the image output data is printed. With respect to each of the falsification detection results, displaying or printing of the falsification detection being present or not present can be performed. Moreover, document information and the falsification detection results converted into an image are combined, and thus a part where the falsification is carried out can be explicitly displayed or printed.

By performing the processing of the present embodiment in this way and checking the results obtained by performing the falsification detection through the use of various parameters, it is possible to appropriately determine whether or not falsification was carried out and at what part the falsification was carried out.

[Other Embodiment]

The object of the present invention can also be achieved by performing the following processing. A storage medium that records a software program code for realizing the functions of the embodiments described above is fed to a system or device, and a computer (or a CPU, a MPU or the like) of the system or device reads the program code stored in the storage medium. In this case, the program code itself read from the storage medium realizes the functions of the embodiments described above, and the program code and the storage medium storing the program code constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-280736 filed Dec. 10, 2009 which is hereby incorporated by reference herein in its entirety.

What is claimed is:

1. An image falsification detection device comprising:
    a decoding means for extracting, from an image of interest including a falsification detection code generated based on an original document image, the falsification detection code, and for decoding the falsification detection code to acquire falsification detection information;
    a difference calculation means for calculating a differential image between the falsification detection information acquired by said decoding means and said image of interest;
    a threshold value calculation means for calculating feature information from the differential image calculated by said difference calculation means, and for calculating a threshold value for determining whether or not a region is said falsified region corresponding to the calculated feature information; and
    a determination means for determining that, in the differential image calculated by said difference calculation means, a region having a difference larger than the threshold value calculated by said threshold value calculation means is the falsified region.

2. The image falsification detection device according to claim 1, further comprising:
    a feature information resolution lowering means for converting the differential image calculated by said difference calculation means into a lower resolution image,
    wherein said threshold value calculation means uses the lower resolution image converted by said resolution lowering means as the differential image to calculate said feature information.

3. The image falsification detection device according to claim 1,
    wherein said decoding means uses error detection information previously included in the falsification detection code to perform error detection, and, when an error is detected, said detected error is corrected, and
    said threshold value calculation means acquires, when calculating said threshold value, said falsification detection information by using said falsification detection code in which the error is corrected.

4. The image falsification detection device according to claim 1, further comprising:
    an output means for displaying on a display screen a result of the determination on the falsified region determined by said determination means,
    wherein said threshold value calculation means calculates different threshold values according to different conditions, and
    said determination means uses a plurality of threshold values calculated by said threshold value calculation means to determine falsified regions.

5. An image falsification detection method comprising:
    a decoding step of extracting, from an image of interest including a falsification detection code generated based on an original document image, the falsification detection code, and of decoding the falsification detection code to acquire falsification detection information;
    a difference calculation step of calculating a differential image between the falsification detection information acquired in said decoding step and said image of interest;
    a threshold value calculation step of calculating feature information from the differential image calculated in said difference calculation step, and of calculating a threshold value for determining whether or not a region is said falsified region corresponding to the calculated feature information; and
    a determination step of determining that, in the differential image calculated in said difference calculation step, a region having a difference larger than the threshold value calculated in said threshold value calculation step is the falsified region.

6. An image falsification detection device comprising:
    a decoding means for extracting, from an image of interest including a falsification detection code generated based on an original document image, the falsification detection code, and for decoding the falsification detection code to acquire falsification detection information;
    a difference calculation means for calculating a differential image between the falsification detection information acquired by said decoding means and said image of interest;
    a threshold value calculation means for dividing the differential image into a plurality of blocks, determining an average value and a standard deviation for each of the divided blocks, determining small-standard-deviation blocks among the divided blocks, each of which has a smaller standard deviation than at least a predetermined percentage of all the divided blocks, averaging standard deviations over all the small-standard-deviation blocks to obtain an averaged standard deviation, averaging average values over all the determined small-standard-deviation blocks to obtain an averaged average value, and determining a threshold value for determining whether or not a region is a falsified region from the averaged standard deviation and the averaged average value; and
    a determination means for determining that, in the differential image calculated by said difference calculation means, a region having a difference larger than the threshold value calculated by said threshold value calculation means is the falsified region.

7. An image falsification detection method comprising:

a decoding step of extracting, from an image of interest including a falsification detection code generated based on an original document image, the falsification detection code, and of decoding the falsification detection code to acquire falsification detection information;

a difference calculation step of calculating a differential image between the falsification detection information acquired in said decoding step and said image of interest;

a threshold value calculation step of dividing the differential image into a plurality of blocks, determining an average value and a standard deviation for each of the divided blocks, determining small-standard-deviation blocks among the divided blocks, each of which has a smaller standard deviation than at least a predetermined percent of all the divided blocks, averaging standard deviations over all the small-standard-deviation blocks to obtain an averaged standard deviation, averaging average values over all the determined small-standard-deviation blocks to obtain an averaged average value, and determining a threshold value for determining whether or not a region is a falsified region from the averaged standard deviation and the averaged average value; and a determination step of determining that, in the differential image calculated in said difference calculation step, a region having a difference larger than the threshold value calculated in said threshold value calculation step is the falsified region.

* * * * *